Patented Nov. 22, 1949

2,489,200

UNITED STATES PATENT OFFICE 2,489,200

SEPARATION OF VANILLIN FROM ALKALINE SOLUTIONS

Charles A. Sankey and Harry Borden Marshall, St. Catharine's, Ontario, Canada, assignors to The Ontario Paper Company Limited, Thorold, Ontario, Canada No Drawing. Application September 28, 1946, Serial No. 700,160. In Canada July 26, 1946

1 Claim. (Cl. 260—600)

This invention relates to the separation of vanillin from alkaline solutions. In particular it relates to the separation of vanillin produced from lignin-containing materials by processes of oxidation in an alkaline medium.

A number of methods are known whereby vanillin can be formed by the oxidation in an alkaline medium of lignin-containing substances. The vanillin as so produced is admixed with other organic materials resulting from break-down of the ligneous raw material and such other materials as are present dependent on the particular method of vanillin production employed. The separation and subsequent isolation of vanillin from the end products of the oxidation is an important part of the production of vanillin from lignin-containing materials.

Two methods have previously been employed to effect the separation of vanillin. The first involves acidification of the vanillin-containing residue, thereby releasing vanillin from the appropriate alkaline salt with which it is combined in said residue, followed by extraction of the vanillin with a substantially water-immiscible organic solvent, for example, benzene. The second involves the extraction of the sodium salt of vanillin by the use of a substantially water-immiscible alcohol, e. g. normal butyl alcohol and subsequent recovery of the vanillin from the butyl alcohol solution. By this latter means the step of acidification is avoided.

The separation of vanillin by solvent extraction involves the treatment of a vanillin-containing solution with a solvent such that two phases are formed or maintained and such that vanillin has an appreciable solubility in that phase predominantly composed of the solvent. Although it may appear that a water-miscible alcohol, for example propanol, may be separated from aqueous admixture into two phases by the establishment of a high dissolved solid content in the predominantly aqueous phase and may therefore be used for separation of vanillin, the combination of using such a water-miscible alcohol and a salting-out effect or high solid content would be highly disadvantageous in that either the aqueous solution would have to be evaporated to small bulk to increase the solid content thereof or alternately large quantities of salt or other similar material added to provide the required solid content for separation of phases.

We have now discovered that vanillin may be separated from an aqueous alkaline residue containing the same without acidification by the use of an alcohol which is water-miscible but which is substantially immiscible with a dilute aqueous alkali, such as the said residue. An example of such an alcohol is tertiary butyl alcohol. Moreover this alcohol forms two phases with dilute aqueous alkali without the requirement of a high solid content of the aqueous layer, and therefore avoids the disadvantages inherent in the possible use of such water-miscible alcohols as propanol.

The specific properties of tertiary butyl alcohol, namely, that it is a highly satisfactory extractant for the sodium salt of vanillin and is immiscible with dilute aqueous alkaline solutions, are unique and constitutes an important advance in the art of isolation of vanillin from such solutions.

The use of tertiary butyl alcohol also shares the advantages of the use of water-immiscible alcohols, for example normal butyl alcohol, over methods of solvent extraction of an acidified vanillin-containing residue in that the step of acidification is eliminated, and with this elimination, the known difficulties of emulsion formation consequent to acidification are avoided.

To illustrate the application of our invention, the following is a description of an experiment performed by us. 100 cc. of the residual liquid from an alkaline oxidation of a waste sulphite liquor after fermentation to produce ethyl alcohol and remove all the said ethyl alcohol therefrom, was extracted with 100 cc. of tertiary butyl alcohol to equilibrium and the vanillin then analytically determined in each layer. Of a total vanillin content of 0.7 gram per 100 cc. residual liquid, 0.46 gram or 65.5% was removed by the single extraction with tertiary butyl alcohol corresponding to a partition coefficient for vanillin between tertiary butyl alcohol and the dilute aqueous alkaline solution of 1.9.

Another aliquot of this same reaction liquid was extracted to equilibrium with 100 cc. of normal butyl alcohol and the vanillin analytically determined in each layer as before. The normal butyl alcohol layer contained 0.25 gram vanillin, or 35.5% was removed by the single extraction with normal butyl alcohol corresponding to a partition coefficient of 0.55.

When the term "dilute aqueous alkali" is used herein, reference is made to an alkaline solution containing at least 5% sodium hydroxide or equivalent alkali.

It is desired to comprehend within the invention such modifications as may be embraced within the claim and the scope of the invention.

What we claim as our invention is:

A method of separating vanillin in the form of its alkali metal salt from an aqueous alkaline solution containing the same which consists in extracting the said solution with tertiary butyl alcohol.

CHARLES A. SANKEY.
H. BORDEN MARSHALL.

REFERENCES CITED

The following references are of record in the file of this patent:

UNITED STATES PATENTS

| Number | Name | Date |
|---|---|---|
| 2,399,607 | Servis | Apr. 30, 1946 |
| 2,414,385 | Milas | Jan. 14, 1947 |